(12) United States Patent  
Poquette et al.

(10) Patent No.: US 9,607,801 B2  
(45) Date of Patent: Mar. 28, 2017

(54) FRICTION WELDING OF X-RAY TUBE COMPONENTS USING INTERMEDIATE FILLER MATERIALS

(71) Applicant: General Electric Company, Schenectady, NY (US)

(72) Inventors: Ben David Poquette, Milwaukee, WI (US); Michael Scott Hebert, Milwaukee, WI (US); Kirk Alan Rogers, Chagrin Falls, OH (US); Michael Louis Szugye, Warrensville Heights, OH (US); Gregory Alan Steinlage, Milwaukee, WI (US); Donald Robert Allen, Wuakesha, WI (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 14/491,528

(22) Filed: Sep. 19, 2014

(65) Prior Publication Data

US 2016/0086760 A1  Mar. 24, 2016

(51) Int. Cl.
*H01J 35/00* (2006.01)
*H01J 35/10* (2006.01)
*B23K 20/12* (2006.01)

(52) U.S. Cl.
CPC ........... *H01J 35/101* (2013.01); *B23K 20/12* (2013.01); *H01J 2209/18* (2013.01); *H01J 2235/1006* (2013.01)

(58) Field of Classification Search
CPC .. H01J 35/00; H01J 35/02; H01J 35/06; H01J 35/065; H01J 35/08; H01J 35/10; H01J 35/101; H01J 35/103; H01J 35/16; H01J 35/165; H01J 2235/00; H01J 2235/06; H01J 2235/08; H01J 2235/081; H01J 2235/083; H01J 2235/084; H01J 2235/086; H01J 2235/1006; H01J 2235/1013; H01J 2235/102; H01J 2235/1046; H01J 2209/18
USPC ................................ 378/121, 122, 125, 132
See application file for complete search history.

(56) References Cited

U.S. PATENT DOCUMENTS

| 5,592,525 A   | 1/1997 | Reznikov et al. |
| 6,751,293 B1* | 6/2004 | Barrett .................. H01J 35/101 378/121 |

* cited by examiner

*Primary Examiner* — Jurie Yun
(74) *Attorney, Agent, or Firm* — Boyle Fredrickson, S.C.

(57) ABSTRACT

A structure and associated process for joining dissimilar materials to form various components of an x-ray tube is illustrated that utilizes one or more intermediate or interfacial filler material members positioned between the primary welding or mating surfaces of the base material components to be joined. The use of the interfacial or intermediate filler material preserves the multiple benefits of friction welding, as well as enabling the joining of highly dissimilar material components, decreasing the required joining temperature, and providing increased microstructural control of the resulting weld or joint.

20 Claims, 5 Drawing Sheets

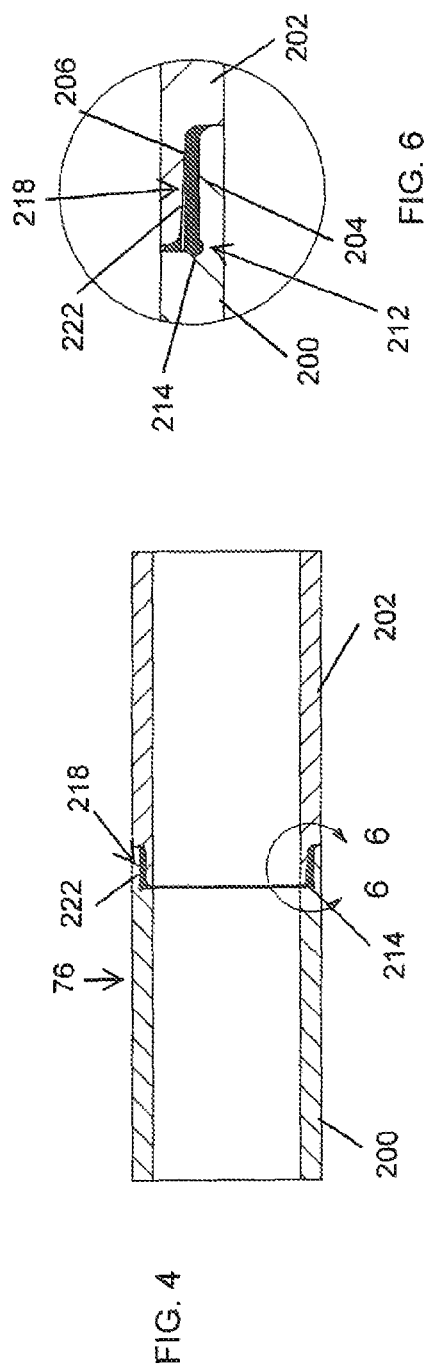
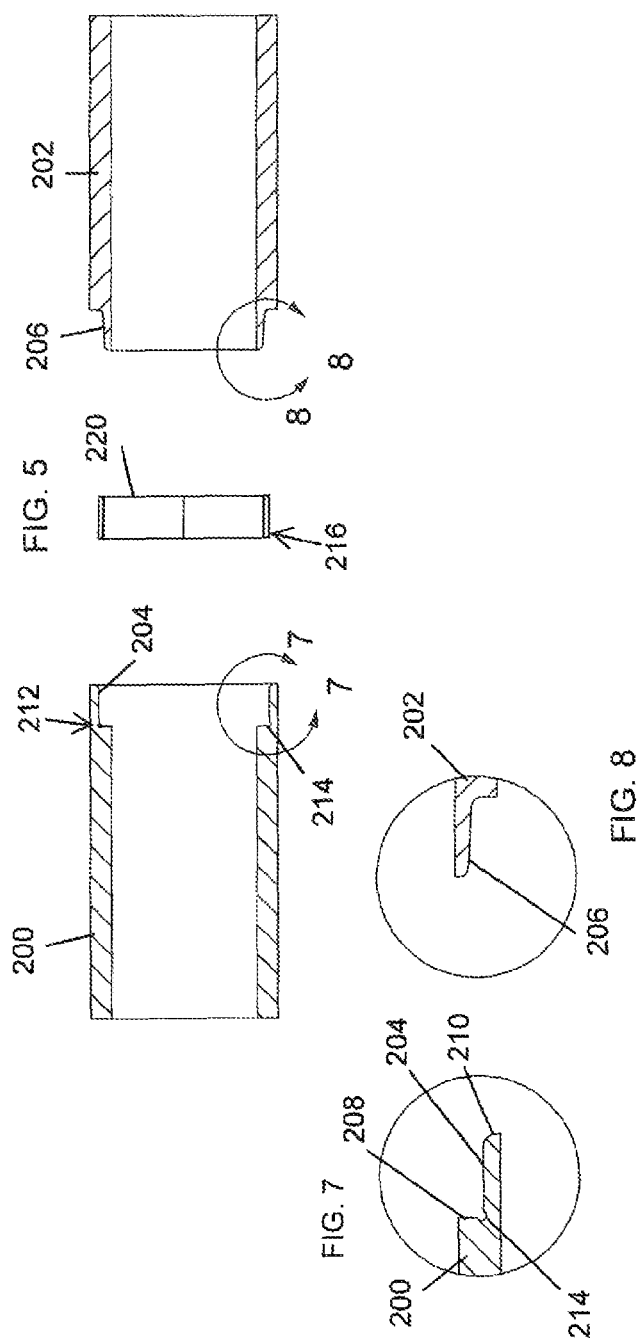

FRICTION WELDING OF X-RAY TUBE COMPONENTS USING INTERMEDIATE FILLER MATERIALS

BACKGROUND OF THE INVENTION

The invention relates generally to X-ray tubes, and more particularly to structures and methods of assembly for the shaft of the anode utilized in an X-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. The anode structure is typically supported by one or more bearing members, such as ball bearings, and is rotated for the purpose of distributing the heat generated at a focal spot. Typically, an induction motor is employed to rotate the anode, the induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

In other constructions, a liquid metal bearing may be employed in lieu of ball bearings. Advantages of liquid metal bearings include a high load capability and a high heat transfer capability due to an increased amount of contact area as compared to a ball bearing. Advantages also include low acoustic noise operation as is commonly understood in the art. Gallium, indium, or tin alloys are typically used as the liquid metal, as they tend to be liquid at room temperature and have adequately low vapor pressure, at operating temperatures, to meet the rigorous high vacuum requirements of an x-ray tube. However, liquid metals tend to be highly reactive and corrosive. Thus, a base metal that is resistant to such corrosion is desirable for the components that come into contact with the liquid metal bearing, such as the shaft of the anode assembly.

As a result, in either construction, the structure of the shaft to which the anode is connected must be capable of withstanding the high temperatures and mechanical stresses created within the x-ray tube, as well as be able to withstand the corrosive effects of the liquid metal bearing. As such, a refractory metal such as molybdenum or tungsten is typically used as the base material for the construction of the shaft as well as for the bearing components. Not only are such materials resistant to corrosion and high temperatures, but they tend to be vacuum-compatible and thus lend themselves to an x-ray tube application.

However, rather than have a shaft formed of a single material, it is desirable in many situations to form the shaft of different materials, each material having properties suited to the particular application or position of the shaft portion within the x-ray tube. For example, the material used for the thrust and journal surfaces of the bearing shaft must exhibit minimal reaction with the any liquid metal bearing fluid at the temperatures experienced during bearing processing and operation. However, the optimum materials used for the bearing surfaces are different from those used for the welding to the x-ray tube assembly. As a result, the dissimilar materials need to be hermetically joined in order to form the shaft.

One technique for minimizing base material expense and improving functionality is to include the preferred base metal (i.e., tungsten or molybdenum) only in regions that require the characteristics of the particular base metal. An extension made of a less expensive material may then be brazed thereto, the extension serving as a mechanical connection as support for an anode. In other words, as an example, a stationary center shall may support a rotatable support structure having an anode attached thereto. The center shaft may be made entirely of the preferred base metal, or the cost thereof may be reduced by attaching a less expensive steel thereto via brazing, thus reducing the total amount of the preferred base metal. Such a design may result in cost savings because of the less expensive steel portion being used in lieu of the preferred base metal. However, cost savings achieved while using this technique are typically offset to an extent by the additional attachment processing, such as by attaching the extension thereto having a hermetic seal.

However, when using brazing as the method for joining the dissimilar materials together very high temperatures are required, which can negatively affect the mechanical properties of the materials being joined, thereby reducing the tube life.

In an alternative method, the shaft can be formed by friction welding where the primary weld surfaces of the dissimilar materials are brought together under intense pressure and relative motion creating conditions (heat, mechanics, etc.) allowing these surfaces of the differing materials to metallurgically bond in solid state. An example of this is shown in U.S. Pat. No. 5,592,525. Traditional friction welding requires specific localized conditions that drive the bonding in the materials making up the primary welding surfaces. As the material properties of the primary surface materials diverge, the complexity of process design becomes complex and often infeasable and ultimately uneconomical. In short, friction welding is limited to particular material combinations and requires significant mechanical energy input to achieve quality joints and can degrade the properties of the base materials due to phenomenon such as grain growth.

As a result, it is desirable to develop a structure and method for the formation of a bearing shaft for an x-ray tube anode that can be formed with dissimilar materials but without degrading the desirable properties of the materials being joined.

BRIEF DESCRIPTION OF THE INVENTION

In the present invention a structure and associated process for joining dissimilar materials to form various components of an x-ray tube is illustrated that utilizes one or more intermediate or interfacial filler material members positioned between the mating or welding surfaces of the base materials to be joined. The use of the interfacial member preserves the multiple benefits of friction welding, as well as enabling the joining of dissimilar or highly dissimilar materials, decreasing the required joining temperature, and providing increased microstructural control of the resulting weld. The incorporation of the intermediate material members enables friction joining/inertial welding of highly dissimilar materials as well as significant process simplification of traditional materials systems due to the ability of the interfacial material member to interact with each of the base materials to be joined in a manner that provides a strong connection between the interfacial material member and the base materials.

In the method, the intermediate or interfacial filler material member is positioned between the mating or weld surfaces of the base materials to be joined. This intermediate material member can be applied to either or both surfaces prior to welding or can be a stand alone preform or preforms. This filler material can interact with the base materials in the molten or solid state either directly or by augmenting the thermodynamics of the primary weld surface materials. The interaction between filler material(s) and base materials is generally driven thermally, with heat provided to the system of the base materials and the intermediate material(s) in the method by any combination of preheating, direct heating during joining, or by exothermic reactions of the constituent materials forming the resulting weld or joint.

The addition of an intermediate filler material into a traditional friction welded joint provides several benefits. These benefits include overall manufacturing process simplification, the expansion of the possible base materials to be joined, and the enhancement of the material structure of both the joint and the resulting structure formed by the joint and the base materials. With regard to the overall process simplification, the use of friction or inertia welding results in a lower required joining temperature, and consequently a decreased cycle time for the process, lower equipment costs, and decreased stress applied to the base materials when joined. Concerning the expansion of the dissimilar materials that may be joined, the intermediate filler material enables less expensive alloys to be used as the base materials and base materials with wider differences in material properties of the primary surface materials due the ability of the intermediate material to effectively join the various base materials. Also, with regard to the resulting structure of the materials joined using the intermediate material, the structure and performance of the joint can be tailored to provide enhanced joint properties such as the avoidance of the creation of grain growth or unwanted phases in the joint, greater joint texture control provided the greater temperature flexibility in the friction/inertia welding process, and the ability to tailor the joint to increase hermetic seal length, leading to a more torturous gas leak path, among others.

In another exemplary embodiment of the invention, the invention is an assembly adapted for use with an x-ray tube, the assembly comprising a first component formed of a first material and having a first mating surface thereon, a second component formed of a second material and having a second mating surface thereon, the second mating surface defining a space with the first mating surface, and an intermediate member disposed within the space between the first mating surface and the second mating surface.

In still another exemplary embodiment of the invention the invention is a method for forming an assembly for use in an x-ray tube, the method comprising the steps of providing a first component formed of a first material and having a first mating surface thereon, a second component formed of a second material and having a second mating surface thereon that defines a space with the first mating surface, placing an intermediate filler material between the first mating surface and the second mating surface; and pressing the first component and the second component towards one another to form a joint between the first mating surface and the second mating surface within the space of the intermediate filler material.

In still a further exemplary embodiment of the invention, the invention is An x-ray tube comprising a frame, a cathode assembly disposed in the enclosure and an anode assembly disposed in the enclosure spaced from the cathode assembly, wherein the anode assembly comprises a first component formed of a first material and having a first mating surface thereon a second component formed of a second material and having a second mating surface thereon, the second mating surface defining a space with the first mating surface; and an intermediate filler member disposed within the space between the first mating surface and the second mating surface to form a joint therebetween.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 is a schematic view of a shaft formed of dissimilar materials in accordance with an exemplary embodiment of the invention.

FIG. 5 is an exploded schematic view of a shaft formed of dissimilar materials in accordance with an exemplary embodiment of the invention.

FIG. 6 is a schematic view of a mating surface on one base material component of a shaft formed of dissimilar materials in accordance with an exemplary embodiment of the invention.

FIG. 7 is a schematic view of a mating surface on another base material component of a shaft formed of dissimilar materials in accordance with an exemplary embodiment of the invention FIG. 8 is a schematic view of a weld formed between mating surfaces on base material components of a shaft formed of dissimilar materials in accordance with an exemplary embodiment of the invention.

DETAILED DESCRIPTION OF THE INVENTION

Figure 1:
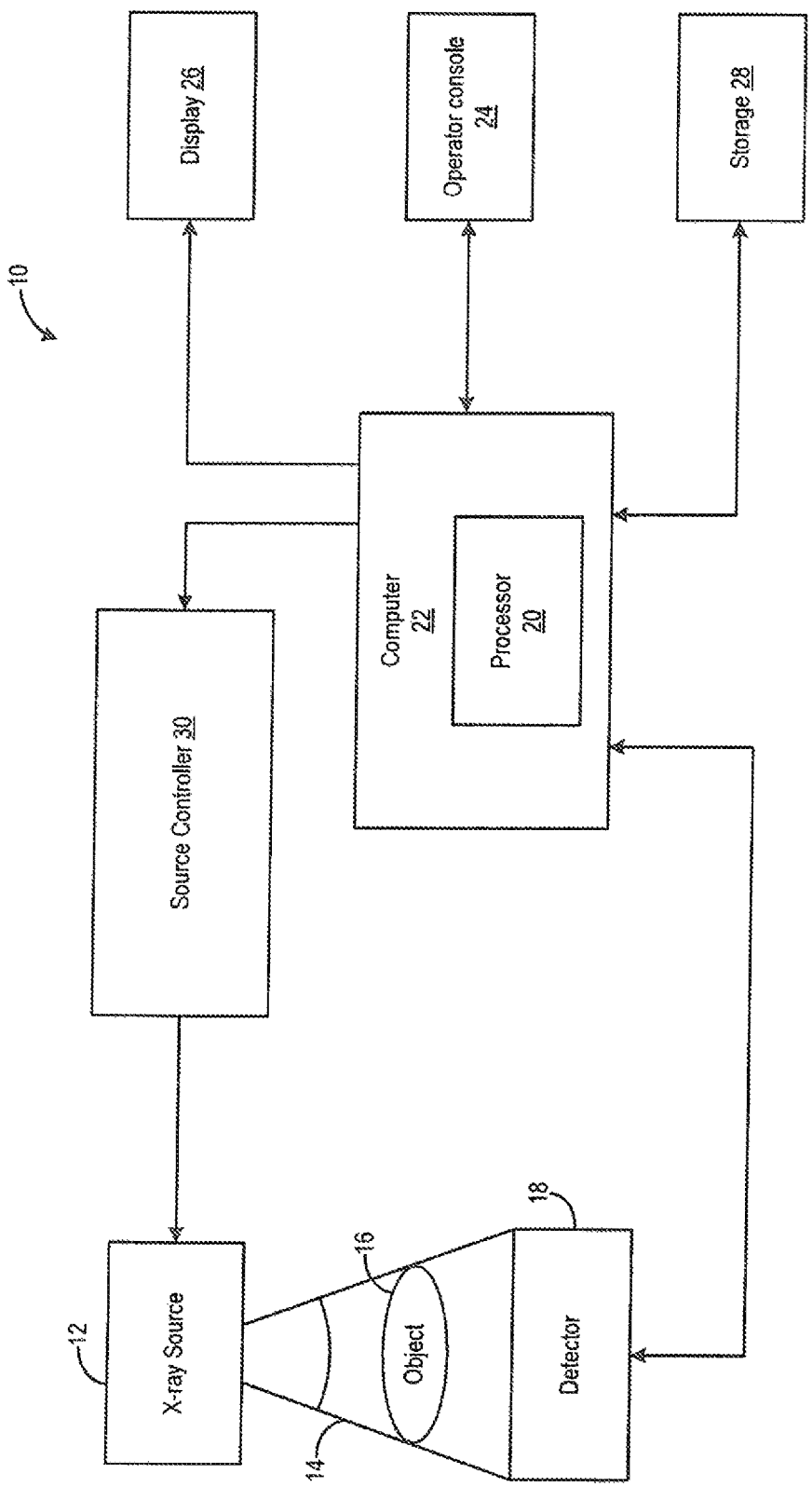
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) kcV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
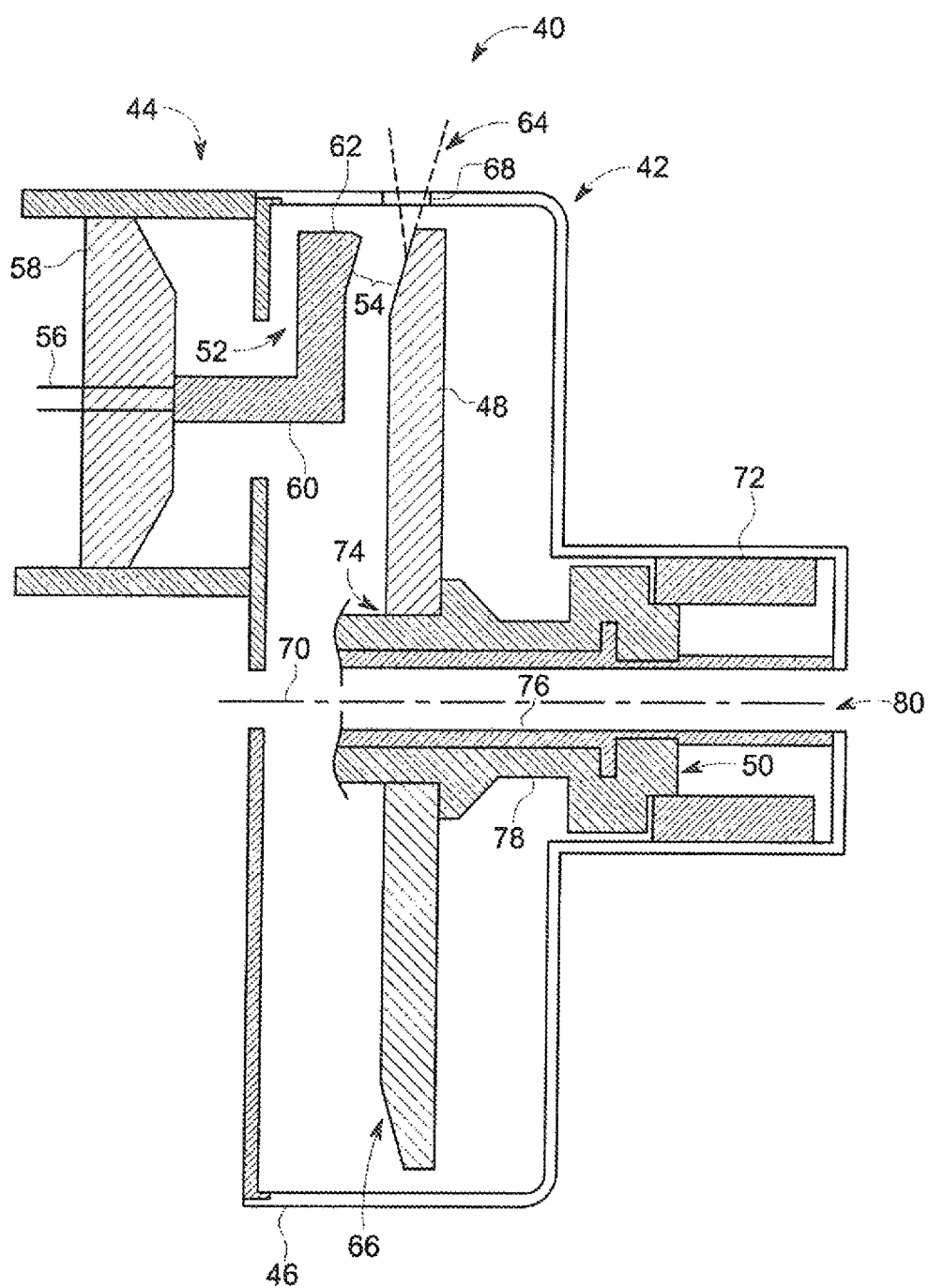
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of for example, sixty (60) thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and an annular opening 74 in the center thereof for receiving bearing assembly 50.

Target 48 may be manufactured to include a number of metals or composites, such as tungsten, molybdenum, copper, or any material that contributes to bremsstrahlung, i.e., deceleration radiation, when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-bearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 may optionally include a cavity or coolant flow path 80 though which a coolant 82 (FIG. 3), such as oil, may flow to cool bearing assembly 50. As such, coolant 82 enables heat generated from target 48 of x-ray source 40 (FIG. 2) to be extracted therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 3:
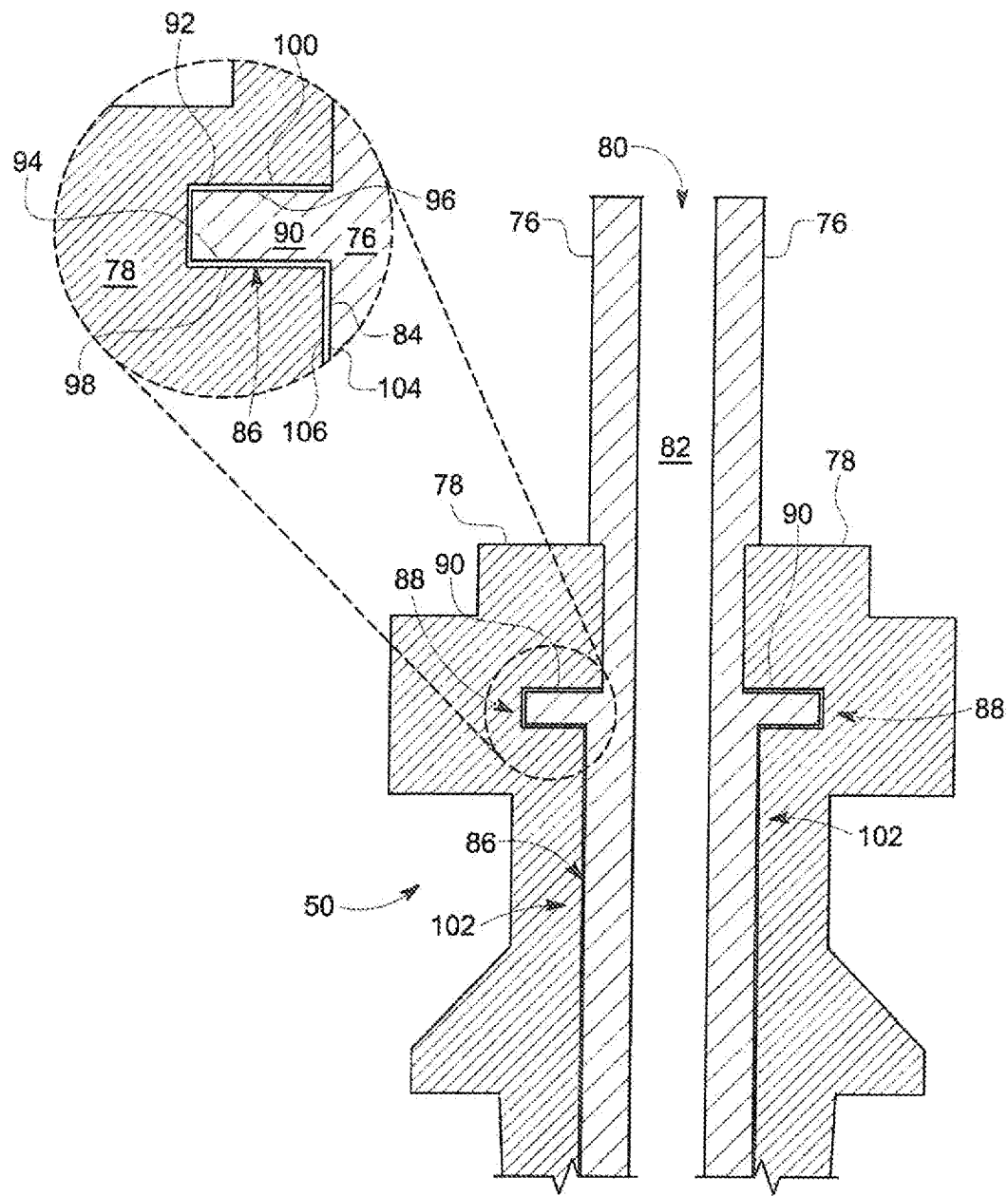
FIG. 3 is a schematic view of an X-ray tube in accordance with an exemplary embodiment of the invention.

Referring now to FIG. 3, a cross-sectional view of a portion of bearing assembly 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

Exemplary base materials of center shaft 76 and sleeve 78 of bearing assembly 50 include ceramics, metals, and combinations thereof. In one embodiment, center shaft 76 and sleeve 78 are constructed of the same base material. Alternatively, the base materials of center shaft 76 and sleeve 78 may differ.

In the embodiment illustrated in FIG. 3, center shaft 76 of bearing assembly 50 is a stationary component and sleeve 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of sleeve 78. Radial projection 90 of thrust bearing portion 88 includes a pair of outer race surfaces 94, 96 that face inner race surfaces 98, 100 of sleeve 78. In cantilever mount embodiments, sleeve 78 may also include a removable endcap (not shown) to allow assembly of components. Radial projection 90 limits axial motion of sleeve 78 relative to center shaft 76, and, as illustrated, lubricant 84 is also included between radial projection 90 and sleeve 78. Radial projection 90 need not be limited in axial length, but may be extended in axial length to provide additional mechanical support of components.

A radial or journal bearing portion 102 of bearing assembly 50 is located adjacent thrust bearing portion 88. An outer surface 104 of journal bearing portion 102 of center shaft 76 faces an inner surface 106 of journal bearing portion 102 of sleeve 78. While journal bearing portion 102 is illustrated on a first side of thrust bearing portion 88 adjacent outer race surface 94, one skilled in the art will recognize that bearing assembly 50 may include a second journal bearing portion located on a second side of thrust bearing portion 88 adjacent outer race surface 96. Various coatings, textures, and patterns including grooves embedded in the contacting surfaces of bearing assembly 50 may be applied to alter bearing behavior as the shall 76 and sleeve 78 rotate relative to each other.

Bearing assembly 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a fluid dynamic bearing and liquid bearing as well. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum inside the x-ray tube may function improperly, degrade quickly, and/or destroy the pressure inside the x-ray tube. For similar reasons, o-rings, grease, or other conventional means for aiding in rotational lubrication between two components may be undesirable because of the vacuum in the x-ray lube. Greases and other lubricants with lower vapor pressure than liquid metals may vaporize and destroy the vacuum. In some examples, physical walls of different shapes and sizes may be placed at different angles to capture the lubricant to reduce leakage through the bearing.

The second general method includes utilizing the capillary forces of the lubricant, wherein the small gap between two opposing bearing surfaces wets the fluid to retain the fluid within the gap. In other words, the anti-wetting properties of the surface (via texturing, coating, or both) aids in preventing the lubricant from flowing in between the small gaps. In some examples, the surfaces are coated and/or textured to be more wetted such that the lubricant clings in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 50 microns.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft and sleeve are rotating relative to each other. As such, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which cases the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid. However, anti-wetting between some bearing surfaces and the lubricating fluid allows friction between the bearing surfaces to be reduced, thereby reducing operating temperatures of the bearing assembly.

Figure 9:
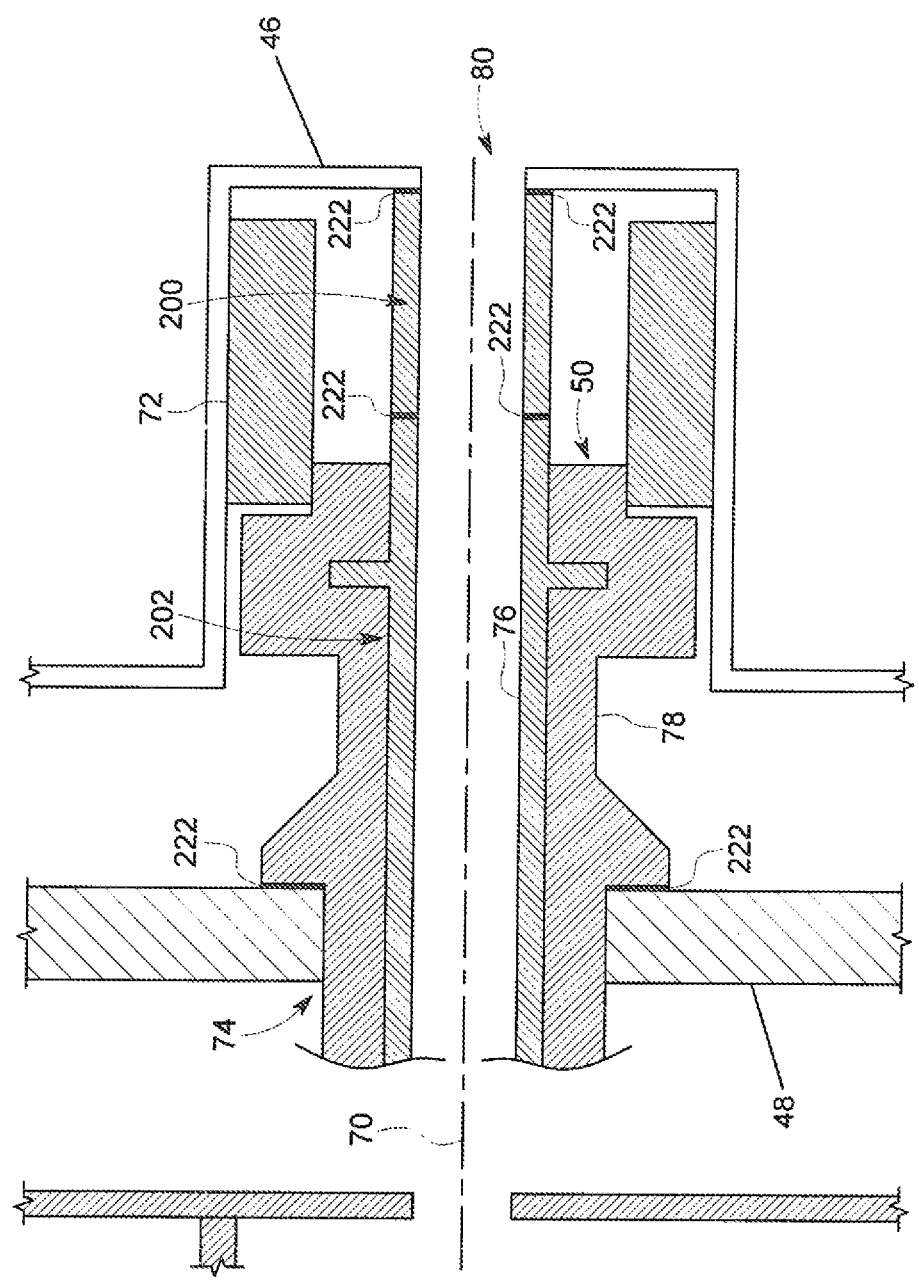
FIG. 9 is a schematic view of and X-ray tube and shaft formed of dissimilar materials in accordance with an exemplary embodiment of the invention.

In FIG. 4 in an exemplary embodiment of the invention a construction of the anode assembly 42 is illustrated. In the assembly 42, the shaft 76 is formed of a pair of component structures 200 and 202 joined to one another to form the shaft 76. In this exemplary embodiment, the components or structures 200 and 202 are formed of different materials, such as different grades of stainless steel for the application of forming the bearing shaft 76 for use in a spiral groove bearing of the x-ray tube 40. The reason for using different materials for components 200 and 202 to form the shaft 76 is due to the differing requirements of the different components 200,202 of the shaft 76. In the exemplary embodiment of FIG. 9, the component 200 is welded to the frame 46, and thus the component 200 is a material with a very low carbon level (≤0.05 wt % C and preferably ≤0.03 wt. %) to prevent the formation of grain boundary carbides that can cause loss of hermeticity. The component 202 is exposed to gallium alloy, i.e., the metal lubricant utilized, and therefore the material forming the component 202 must have a very low reaction rate with liquid gallium alloy. Referring to FIG. 5-7, the components 200,202 are formed with complementary mating surfaces 204,206. The mating surfaces 204,206 can have any suitable profile, but in the exemplary embodiment the surface 204 on component 200 is formed on the inner diameter of the component 200, while the surface 206 is formed on the outer diameter of the component 202. While the surface 206 can be placed on either structure 200 or 202, in an exemplary embodiment the surface 206 is present on the structure 200 or 202 with the lower coefficient of thermal expansion such that the resulting joint 222 will be in compression after formation. Further, the surfaces 204,206 are formed to be generally smooth, with a radial component 208 and an axial component 210 joined at an intersection 212. The surface 204, and optionally surface 206, also includes a recess 214 (See e.g. FIG. 7) located at the intersection 212 that expands into the component 200 in order to form a point of mechanical engagement between the component 200 and a joint or weld 222. In the exemplary embodiment of FIG. 9, the joint or weld 222 is formed from an interfacial or intermediate member 216 (See e.g. FIG. 5) positioned between the components 200,202, the component 202 and the target 48, and the component 200 and the frame 46. In addition, in the exemplary embodiment of FIG. 9, the joint 222 formed between the shaft components 200 and 202 is disposed outside of the portion of the shaft 76 exposed to the gallium alloy.

While the surfaces 204,206 are generally complementary to one another, they are also shaped to leave a space 218 (See e.g. FIG. 4) between the surfaces 204,206 when the components 200,202 are in the fully engaged position in order to allow for the interfacial or intermediate member 216 to be positioned within the space 218. The intermediate member 216 is formed of a material that is capable of forming stable and structurally sound bonds capable of maintaining high vacuum hermeticity between the components 200,202. In certain exemplary embodiments, the material forming the intermediate member 216 is selected from copper, copper-germanium alloy, copper-silicon alloy, copper-gold alloy, or copper-palladium alloy to facilitate bonding between the dissimilar materials of the components 200,202.

In one particular exemplary embodiment of the formation of a shaft 76 or sleeve 78 for use in an x-ray tube 40 having a spiral groove bearing (SGB), the base materials used for the components 200,202 are refractory metals and alloys thereof, Kovar® (including nickel-cobalt ferrous alloy-based materials), (Kovar® is a registered trademark of Westinghouse Electric and Manufacturing Company, Pittsburgh, Pa.), tool steels, maraging steels (low carbon, ultra-high strength iron alloys known for having superior strength and toughness without losing malleability), iron-nickel (FeNi) alloys, superalloys, or stainless steels. In another particular exemplary embodiment, component 200 is formed of a molybdenum alloy and component 202 is formed of Kovar®. As opposed to the traditional method of joining or welding these materials together by brazing with copper-palladium alloy braze material, which is expensive due to the palladium content required for wetting and also requires a high brazing temperature of 1120° C. relative to the normal joint use temperature, in the exemplary embodiment of the invention a friction/inertia weld can be formed between the components 200,202 using a low-cost, low temperature intermediate material for the intermediate member 216, such as a copper bushing 220. The bushing 220 can take any desired and suitable shape, an in the exemplary embodiment is formed with a cross-sectional shape and area approximately equal to the shape and area defined by the space 218, such that the material forming the bushing 220 can entirely fill the space 218 during the friction/inertia welding process to form the joint or weld 222 (FIG. 8). The friction/inertia welding procedure can be done at room temperature and atmospheric pressure due to the near-instantaneous application of frictional heat in the joining process and results in a strong, hermetic seal between the components 200,202 and the intermediate member 216 without formation of brittle reaction layers. In addition, the flexibility allowed by the use of friction welding to form the joint or weld 222 enables the tailoring of the shape(s) of the surface(s) 204,206 and thus the resulting joint 222 formed between the surfaces 204,206 on the components 200,202 to increase the hermetic seal path length, leading to a more torturous gas leak path, and/or to design in mechanical interlocking features for increased joint strength in operation, such as the recess 214, among other advantages.

In another exemplary embodiment of the invention, to manufacture the x-ray target 48, refractory metal components forming the target 48 must be joined to other refractory or high temperature alloys used to form the sleeve 78. During friction/inertia welding, the use of an intermediate filler material 216 positioned between the surface 204,206 of the material forming the target 48 or component 200, and the surface 204,206 of the material forming the sleeve 78 or component 202, allows joints 222 to be created at a reduced process temperature. In this exemplary embodiment, typical materials for the x-ray target 48 and sleeve 78 include TZM, TZC, MHC, Mo—V, ODS Mo and W. These materials can be joined to one another using traditional braze filler alloys as the intermediate material 216, including Cu-ABA, Cusil-ABA, Cusin-1-ABA, Gapasil, Incusil-ABA, Palsil, Ag-ABA, Ticuni, and Tini. Additionally, this technique enables joining of refractory components such as those listed previously to low thermal conductivity alloys with thermal conductivity ≤75 W/mK or more preferably ≤50 W/mK, including but not limited to Nb or IN909. By using the intermediate filler material 216, low thermal conductivity alloys can be used to form the sleeve 78 attached to the target 48, thereby increasing the restriction of heat flow to the bearing assembly 50 through the sleeve 78. Reduced heat flow to the bearing assembly 50 consequently increases the tube life, especially where the bearing assembly 50 includes ball bearings, and simplifies the bearing assembly 50 attachment for SGB architectures. Specifically, the application of a Ti filler material 216 to the TZM to TZM conventional friction weld between the target 48 and the sleeve 78 could reduce the joining temperature from 1500° C. to ~1200° C. which would avoid or minimize the present friction weld heat affected zone (grain growth and voids) created in current friction welding processes.

Additional exemplary embodiments of assemblies in the x-ray tube 40 such as the target 48 and the sleeve 78 that can be joined by a joint 222 formed using the intermediate filler material 216 (FIG. 9) include the joining of a molybdenum SGB shaft 76 to Kovar® shaft ends, and the joining of a molybdenum electron collector (not shown) to a copper heat exchanger (not shown), among others. In another exemplary embodiment, a component 202 can be joined at each end to a separate component 200 by a pair of friction/inertia welding joints 222 each formed from an intermediate filler material 216 positioned between the ends of the component 202 and each adjacent component 200 to form a straddle bearing construction. This exemplary straddle bearing construction can also be reversed with a single component 200 and a pair of components 202 joined to each end of the component 202 by a pair of friction/inertia welding joints 222 formed from the intermediate filler material 216. In addition, the components 200,202 of the various assemblies can be joined by the intermediate filler material 216 in a friction or inertia welding process as disclosed herein, and can subsequently be machined, textured and/or coated as desired, such as to improve the wettability of the components 200,202, as disclosed in U.S. Pat. No. 7,933,382, which is expressly incorporated by reference herein in its entirety.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly adapted for use with an x-ray tube, the assembly comprising:
   a. a first component formed of a first material and having a first mating surface thereon;
   b. a second component formed of a second material and having a second mating surface thereon, the second mating surface defining a space with the first mating surface, the space being at least substantially enclosed by the first mating surface and the second mating surface; and
   c. an intermediate member disposed within the space between the first mating surface and the second mating surface.

2. The assembly of claim 1 wherein the first component and second component are formed from different materials.

3. The assembly of claim 1 wherein the first component is formed of a refractory metal.

4. The assembly of claim 1 wherein the first component is formed of a stainless steel.

5. The assembly of claim 1 wherein the first component is formed of a low thermal conductivity metal.

6. The assembly of claim 1 wherein the first component is an anode.

7. The assembly of claim 6 wherein the second component is selected from the group consisting of a shaft and a sleeve.

8. The assembly of claim 7 wherein the first component is formed of a refractory metal and the second component is formed of a low thermal conductivity alloy.

9. The assembly of claim 1 wherein the first component is a first portion of a shaft.

10. The assembly of claim 9 wherein the second component is a second portion of the shaft.

11. The assembly of claim 1 wherein the intermediate member is a brazing material.

12. An assembly adapted for use with an x-ray tube, the assembly comprising:
   a. a first component formed of a first material and having a first mating surface thereon;
   b. a second component formed of a second material and having a second mating surface thereon, the second mating surface defining a space with the first mating surface; and
   c. an intermediate member disposed within the space between the first mating surface and the second mating surface, wherein the intermediate member is selected from the group consisting of copper, copper-germanium alloy, copper-silicon alloy, copper-gold alloy, and copper-palladium alloy.

13. An assembly adapted for use with an x-ray tube, the assembly comprising:
   a. a first component formed of a first material and having a first mating surface thereon;
   b. a second component formed of a second material and having a second mating surface thereon, the second mating surface defining a space with the first mating surface; and
   c. an intermediate member disposed within the space between the first mating surface and the second mating surface, wherein at least one of the first mating surface and the second mating surface includes a mechanical interlocking feature.

14. A method for forming an assembly for use in an x-ray tube, the method comprising the steps of:
   a) providing a first component formed of a first material and having a first mating surface thereon, a second component formed of a second material and having a second mating surface thereon that defines a space with the first mating surface, wherein the space is substantially enclosed by the first mating surface and the second mating surface;
b) placing an intermediate filler material between the first mating surface and the second mating surface; and
c) pressing the first component and the second component towards one another to form a joint between the first mating surface and the second mating surface within the space of the intermediate filler material.

15. The method of claim 14 wherein the step of pressing the first component and the second component towards one another comprises friction welding the first component and the second component to one another.

16. A method for forming an assembly for use in an x-ray tube, the method comprising the steps of:
  a) providing a first component formed of a first material and having a first mating surface thereon, a second component formed of a second material and having a second mating surface thereon that defines a space with the first mating surface;
  b) placing an intermediate filler material between the first mating surface and the second mating surface; and
  c) pressing the first component and the second component towards one another to form a joint between the first mating surface and the second mating surface within the space of the intermediate filler material, wherein the step of pressing the first component and the second component towards one another comprises friction welding the first component and the second component to one another and wherein the step of friction welding the first component and second component to one another is performed at atmospheric temperature and pressure.

17. A method for forming an assembly for use in an x-ray tube, the method comprising the steps of:
  d) providing a first component formed of a first material and having a first mating surface thereon, a second component formed of a second material and having a second mating surface thereon that defines a space with the first mating surface;
  e) placing an intermediate filler material between the first mating surface and the second mating surface; and
  f) pressing the first component and the second component towards one another to form a joint between the first mating surface and the second mating surface within the space of the intermediate filler material, wherein the step of providing the first component and the second component comprises forming at least one mechanical interlocking feature on at least one of the first mating surface or the second mating surface.

18. An x-ray tube comprising:
  a) a frame defining an enclosure;
  b) a cathode assembly disposed in the enclosure; and
  c) an anode assembly disposed in the enclosure spaced from the cathode assembly, wherein the anode assembly comprises:
    i. a first component formed of a first material and having a first mating surface thereon;
    ii. a second component formed of a second material and having a second mating surface thereon, the second mating surface defining a space with the first mating surface, the space at least substantially enclosed between the first mating surface and the second mating surface; and
    iii. an intermediate filler member disposed within the space between the first mating surface and the second mating surface to form a joint therebetween.

19. The x-ray tube of claim 18 wherein the first component, second component and intermediate filler member form a shaft operably connected to the anode assembly.

20. The x-ray tube of claim 18 wherein the first component forms the anode assembly and the second component forms a shaft or a sleeve operably connected to the anode assembly by the intermediate filler member.

* * * * *